July 14, 1925.                                              1,546,166
H. L. CARMAN
SAW SET
Filed May 16, 1922

Inventor
Henry L. Carman,
By
Attorney

Patented July 14, 1925.

1,546,166

UNITED STATES PATENT OFFICE.

HENRY LESLIE CARMAN, OF FLAGSTAFF, ARIZONA.

SAW SET.

Application filed May 16, 1922. Serial No. 561,436.

*To all whom it may concern:*

Be it known that I, HENRY LESLIE CARMAN, a citizen of the United States of America, residing at Flagstaff, in the county of Coconino and State of Arizona, have invented new and useful Improvements in Saw Sets, of which the following is a specification.

The object of the invention is to provide a simple and convenient form of portable manually operable saw-set adapted to be operated without incurring any severe effort on the part of the operator and under conditions insuring a relative accuracy in the setting of the teeth in so far as uniformity is concerned and under conditions providing for a variation in the position of the tool to suit the convenience of the operator and the peculiarities of the saw which is being dressed; and with these objects in view the invention consists in a construction and combination of parts of which a preferred embodiment is shown in the accompanying drawings, wherein:

Figure 1 is a perspective view of a saw-set embodying the invention applied in the operative position to a saw in the operation of setting a tooth and indicating in relation thereto the position of the hammer used in that connection;

Fig. 2 is a side view of the same showing the tool in another position with relation to the saw blade under conditions requiring the hammer stroke to be applied to the tooth itself and for giving the tooth a set in the opposite direction from that indicated in Fig. 1, as when it is desired to operate the tool uniformly from one side of the saw blade instead of reversing the same in dressing the teeth in opposite directions;

Figures 1, 2:
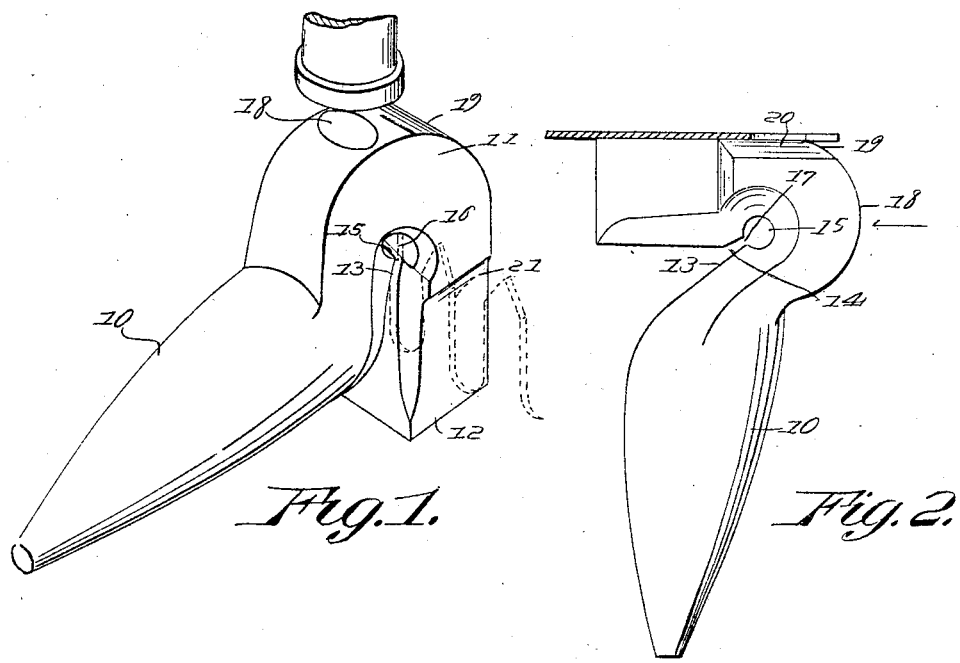

The tool consists essentially of a shank or handle 10 which is preferably of tapered form as shown to afford a firm grip by the operator and resist a tendency to move the grip longitudinally in the hand of the operator when the blow of the setting hammer is applied to the end of the head 11 which is of arched or gooseneck form represented in the drawing as a continuation of the shank or handle and having a depending jaw 12 between the inner side of which and the adjacent face 13 of the head which constitutes an opposing jaw there is provided a tapered throat 14 in communication with an eye 15 designed for the reception of a saw tooth 16. At its apex the throat merges into a narrow passage 17 of a width just sufficient to receive the thickness of the saw blade and disposed at an inclination to the inner face of the jaw 12, so that if the tool is placed on the saw blade with the inner face of the jaw 12 in contact or parallelism with the blade, and the blow of a hammer is applied to an impact face 18 at the crown of the arch formed by the head the tooth which is opposite the seat formed by the passage 17 will be set at exactly the proper angle without further effort or manipulation on the part of the operator.

Should it be desired to effect the setting of a tooth without fitting the throat over the saw blade as for example in the event that the setting operation is being performed on a blade of greater thickness than is provided for by the throat, the outer face of the jaw 12 may be applied to the surface of the saw blade and the bevel 19 at the spring of the arch formed by the head may be utilized as the setting seat, but in this method of using the tool it is necessary to apply the blow of the hammer to the tooth so as to drive the tooth laterally into contact with the seat 19.

Figures 3, 4:
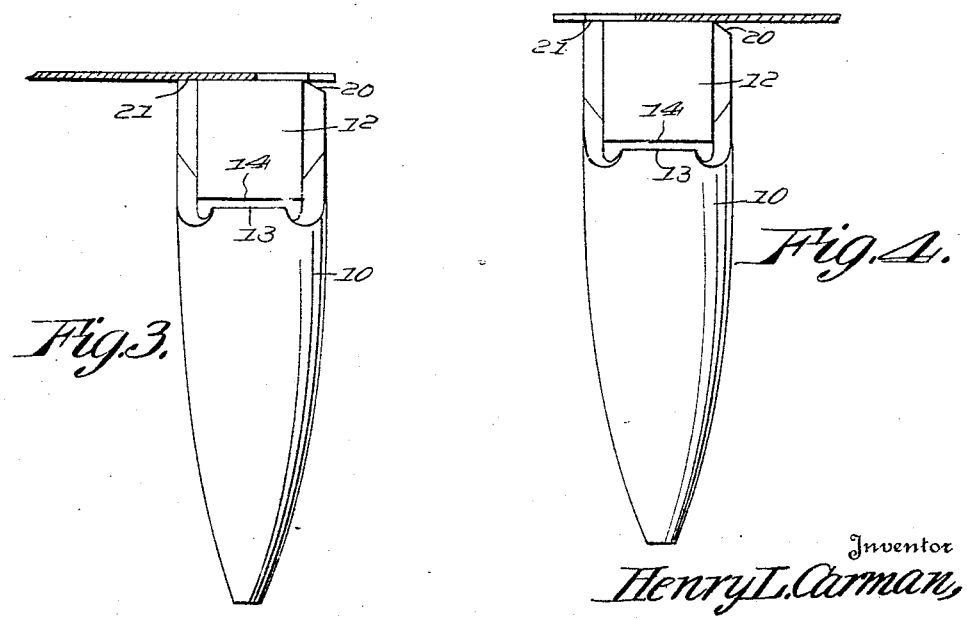
Fig. 3 is a view showing the tool in still another setting position.
Fig. 4 is a view in an additional setting position in which the extent of deflection of the tooth must be determined by the eye of the operator without the aid of a guide.

In the same way a tooth may be set as shown in Fig. 3 by turning the tool at right angles to the position indicated in Figs. 1 and 2 or with the jaw 12 parallel with the saw blade and with the outer surface thereof in contact with the surface of the blade, whereupon the beveled setting seat 20 may be utilized under conditions similar to those described in reference to the seat 19, in that the tooth to be set must be struck directly by the hammer.

Again should it be desired to set a tooth at a slightly greater angle than provided for by the seats hereinabove described, or should it be desired to set a tooth with a more abrupt angle at the line of deflection from the plane of the blade proper, the tool may be reversed from the position indicated in Fig. 3 as shown in Fig. 4 to utilize the angle 21 which is placed at the base of the tooth to be set. In this use of the device, however, the operator must depend upon his eye to determine how far to deflect the tooth and as in the positions indicated in Figs. 2 and 3 must apply the blow of the hammer directly to the tooth.

The rounded bevel afforded by the seat 19 is the one which in practice will be most generally used in the setting of saw teeth for the reason that it provides for applying the tool readily to the tooth and observing the operation of bringing the tooth by the blows of the hammer into proper relation with the seat and further by reason of the fact that a seat in this form is most generally required but the short bevel afforded by the seat 20 is of utility under special conditions and can be utilized practically with the same facility as the seat 19 while the abrupt or right angle setting face represented by the angle 21 will probably in practice be necessary only occasionally as a means of setting a tooth as for example when a particularly long bevel is required and the angle may be arranged at a short distance below the line of the tooth base.

The special purpose of the seat 17 is to remove from the tooth the shoulder which frequently forms thereon after a saw has been run for a considerable time and which appears just below the top of the crank of the tooth and has the effect of making the saw run integrally. This shoulder may be entirely removed by applying the tool thereto in the manner first above described that is through the tapered throat 14 so as to bring the tooth into engagement with the seat 17 and tapping the impact face 18 generally with the hammer in the direction of the arrow adjacent thereto.

A special advantage of the tool in addition to the tapering of the handle or grip resides in the fact that it is compact and that the hand of the operator in grasping the handle has simply to bear against the inner side of the arch or gooseneck forming the head, the said arch bearing against the soft portion of the hand whereby it is cushioned to resist blows applied to the outer face of the jaw 12 by a hammer operating in the direction indicated by the arrow in Fig. 2.

Having described the invention, what is claimed as new and useful is:—

A saw-set comprising a body having a handle shank which merges at one end into an arcuately curved neck portion, the said neck portion merging into a head portion having parallel opposite side surfaces disposed at right angles to the length of the handle shank, the neck portion being provided at its outer side with a plane striking surface disposed parallel with the longitudinal dimension of the handle shank and at a right angle to the planes of the parallel side surfaces of the head portion, said striking surface being disposed between the planes of the parallel side surfaces of the head portion, the inner surface of the neck portion forming an eye which is disposed between the parallel side surfaces of the head portion and at one side of the median longitudinal dimension of the handle shank, the head portion being spaced from the handle shank by a throat which communicates with the eye, and the opposite side surfaces of which are disposed at acute angles to the parallel side surfaces of the head portion, the striking surface, and the median longitudinal dimension of the handle shank.

In testimony whereof he affixes his signature.

HENRY LESLIE CARMAN.